(12) United States Patent
Liu et al.

(10) Patent No.: US 6,519,265 B1
(45) Date of Patent: *Feb. 11, 2003

(54) SYSTEM AND METHOD FOR CONTEXT SWITCHING IN AN ELECTRONIC NETWORK

(75) Inventors: Jung-Jen Liu, San Jose, CA (US); Scott Smyers, San Jose, CA (US); Bruce A. Fairman, Woodside, CA (US); Steve Pham, Milpitas, CA (US); Jose L. Diaz, San Jose, CA (US); Richard A. Bardini, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/322,632

(22) Filed: May 28, 1999

(51) Int. Cl.[7] .............................................. G06F 13/34
(52) U.S. Cl. ...................................... 370/463; 709/250
(58) Field of Search ................................ 709/102, 103, 709/108, 250, 253; 712/34, 228, 229, 230; 370/463; 710/100

(56) References Cited

U.S. PATENT DOCUMENTS

| | | | | |
|---|---|---|---|---|
| 5,450,411 A | * | 9/1995 | Heil ............................ | 370/352 |
| 5,802,288 A | * | 9/1998 | Ekanadham et al. ........ | 709/250 |
| 5,825,774 A | | 10/1998 | Ready et al. | |
| 5,872,962 A | * | 2/1999 | Hisanaga et al. ........... | 395/571 |
| 5,948,080 A | * | 9/1999 | Baker .......................... | 710/37 |
| 5,949,994 A | * | 9/1999 | Dupree et al. .............. | 712/228 |
| 5,960,212 A | * | 9/1999 | Mak ............................ | 712/34 |
| 5,983,301 A | * | 11/1999 | Baker et al. ................. | 710/113 |
| 6,061,711 A | * | 5/2000 | Song et al. .................. | 709/108 |
| 6,169,745 B1 | * | 1/2001 | Liu et al. ..................... | 709/250 |

FOREIGN PATENT DOCUMENTS

| | | |
|---|---|---|
| EP | 0 863 462 A2 * | 9/1998 |
| GB | 2328299 | 2/1999 |

OTHER PUBLICATIONS

Peter Steenkiste, Analysing communication latency using the Nectar communication processor, Aug. 16, 1993, No. 8, London, pp. 742–483.

* cited by examiner

*Primary Examiner*—Patrice Winder
(74) *Attorney, Agent, or Firm*—Gregory J. Koerner; Simon & Koerner LLP

(57) ABSTRACT

A system and method for context switching in an electronic network comprises a memory configured to store instruction modules, each instruction module corresponding to a context, a processor that executes the instruction modules, and a control state machine. The control state machine selects one of the instruction modules for execution by the processor according to context information from the electronic network. The control state machine includes a switch address generator, a return address register, and a program counter select. The switch address generator outputs a switch address, which is an address for a first instruction for a selected-context instruction module. The return address register stores a return address, which is an address of a next consecutive instruction, when an instruction module is interrupted for a context switch. The program counter select outputs the switch address, the return address, or a next consecutive address to select the appropriate instruction in the memory for execution by the processor.

45 Claims, 7 Drawing Sheets

SYSTEM AND METHOD FOR CONTEXT SWITCHING IN AN ELECTRONIC NETWORK

CROSS-REFERENCE TO RELATED APPLICATIONS

This application is related to co-pending U.S. Application Ser. No. 09/336,064, entitled "System And Method For Multi-Level Context-Switching In An Electronic Network," filed on Jun. 18, 1999, and to co-pending U.S. Application Ser. No. 09/363,086, entitled "System And Method For Fast Data Transfers In An Electronic Network," filed on Jul. 27, 1999, which are hereby incorporated by reference. The related applications are commonly assigned.

BACKGROUND OF THE INVENTION

1. Field of the Invention

This invention relates generally to electronic networks, and more a particularly to a system and method for context switching in an electronic network.

2. Description of the Background Art

Implementing an effective method for managing communications between electronic devices within an electronic network is a significant consideration of designers, manufacturers, and users of electronic devices. An electronic device in an electronic network may advantageously communicate with other electronic devices in the network to share data and substantially increase the resources available to individual devices in the network. For example, an electronic network may be implemented in a user's home to enable flexible and beneficial sharing of resources between various consumer electronic devices, such as personal computers, digital video disc (DVD) devices, digital set-top boxes for digital broadcasting, television sets, and audio playback systems.

An electronic device in an electronic network may alternately receive or transmit data across the network. Therefore, an electronic device may be required to function both as a transmitter and a receiver of data. In such a case, the electronic device may be required to switch between a transmit mode and a receive mode, that is, to switch contexts. Context switching is especially important in electronic networks where each device in the network has a combined input/output interface with the network. Since data may be transmitted and received via the same interface, such a device may not transmit data and receive data at the same time. Therefore, a device may need to switch contexts to effectively communicate with other devices in the network.

In some types of electronic networks, electronic devices may be "daisy-chained," so that the devices are directly connected to one another in a tree-like structure instead of being connected to a common network bus structure. In such a network, data being delivered via the bus may pass through various intermediary devices before arriving at the destination device. An intermediary device, in a receive context, may receive data and then switch to a transmit context to transmit the data to another device. Alternately, an intermediary device may transmit data to a destination device in a transmit context, and then switch to a receive context to function as a destination device for different data.

In some electronic networks, when a device is currently preparing to transmit data on the bus, the device typically is not able to receive data at the same time. However, if the device does not receive the data intended for it, that data may be lost. Loss of data may especially be a problem in a situation where the source of the data is a broadcast signal that cannot be repeated if the data is not received. Therefore, effective and efficient context switching is needed to prevent loss of data being sent across the network.

Context switching in an electronic network should be as efficient as possible to maintain effective communications across the network. Therefore, managing communications between electronic devices in an electronic network remains a significant consideration for designers, manufacturers, and users of electronic devices.

SUMMARY OF THE INVENTION

In accordance with the present invention, a system and method are disclosed for implementing context switching in an electronic network. In one embodiment, the invention includes a memory configured to store instruction modules, each instruction module corresponding to a context, a processor that executes the instruction modules, and a control state machine. The control state machine selects one of the instruction modules for execution by the processor according to context information from the electronic network.

Each instruction module stored in the memory corresponds to a context. The contexts may include a cycle start context, a transmit context, or a receive context. The memory preferably stores a cycle start context instruction module, a transmit context instruction module, and a receive context instruction module for each data channel supported by the electronic network. The control state machine selects one of the instruction modules in response to context information contained in data packet headers received from the electronic network.

The control state machine preferably includes a switch address generator, a return address register, and a program counter select. The switch address generator outputs a switch address, which is an address for a first instruction of the instruction module corresponding to a selected context. The return address register stores a return address, which is an address of a next consecutive instruction of an interrupted instruction module. The program counter select outputs the switch address, the return address, or a next consecutive address to select the appropriate instruction in the memory for execution by the processor.

The switch address generator includes a cycle start address register, a transmit address register, and a receive address register. The cycle start address register stores an address for a first instruction of a cycle start instruction module. The transmit address register stores an address for a first instruction for a transmit instruction module. The receive address register stores addresses for first instructions for receive instruction modules. The receive instruction modules include a receive instruction module for each data channel supported by the electronic network.

Execution of an instruction module may be interrupted when a context switch occurs. The return address register stores the return address so that execution of the interrupted instruction module may be resumed at the point where the interruption occurred. The present invention thus efficiently and effectively implements a system and method for context switching in an electronic network.

DETAILED DESCRIPTION OF THE PREFERRED EMBODIMENT

The present invention relates to an improvement in electronic networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a memory configured to store instruction modules, each instruction module corresponding to a context, a processor that executes the instruction modules, and a control state machine. The control state machine selects one of the instruction modules for execution by the processor according to context information from the electronic network. The control state machine preferably includes a switch address generator, a return address register, and a program counter select. The switch address generator outputs a switch address, which is an address for a first instruction of a selected-context instruction module. The return address register stores a return address, which is an address of a next consecutive instruction, when an instruction module is interrupted for a context switch. The program counter select outputs the switch address, the return address, or a next consecutive address to select the appropriate instruction in the memory for execution by the processor.

Figure 1:
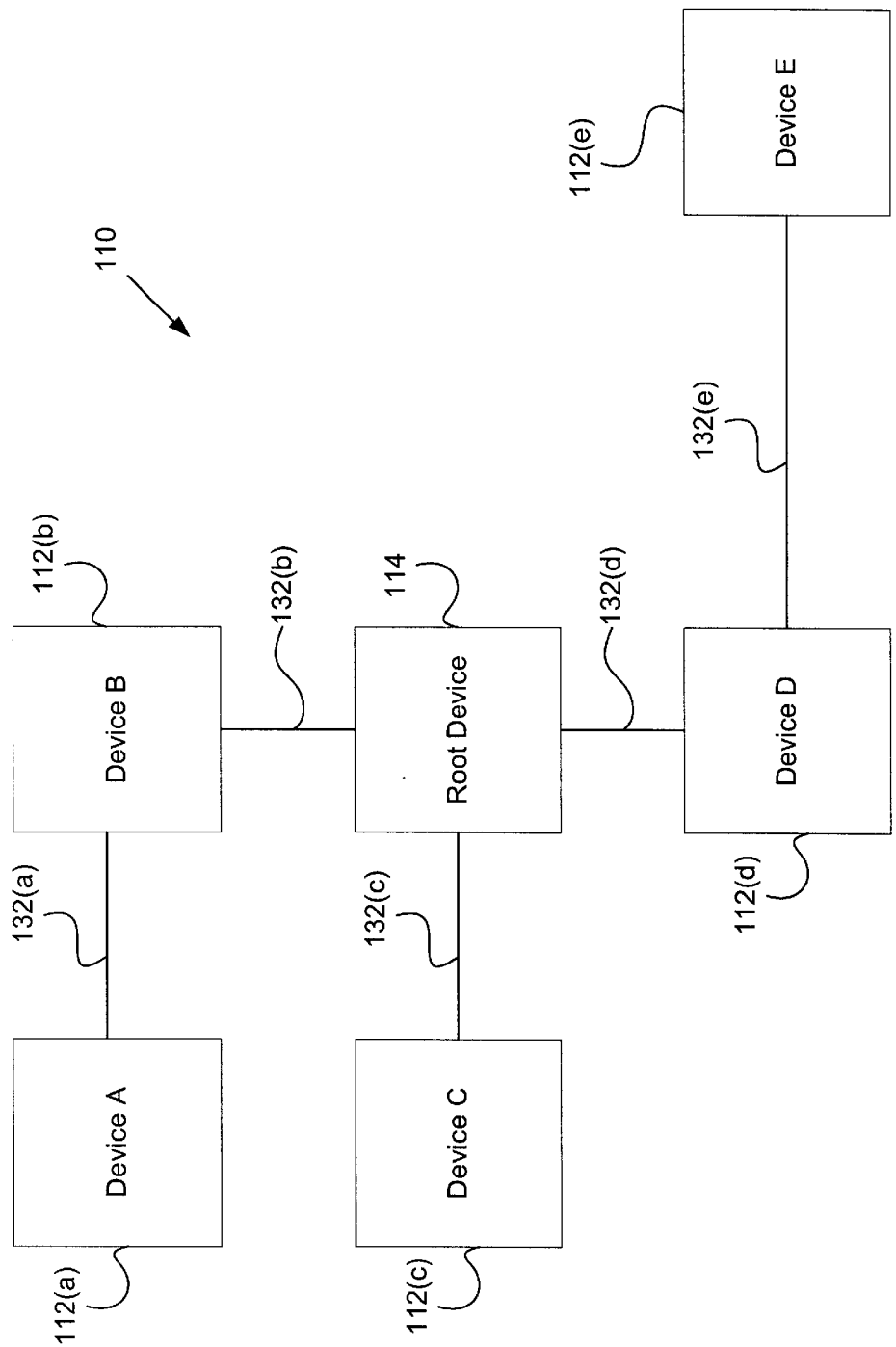
FIG. 1 is a block diagram for one embodiment of an electronic network, according to the present invention.

Referring now to FIG. 1, a block diagram for one embodiment of an electronic network 110 is shown, according to the present invention. The electronic network includes, but is not limited to, a device A 112(a), a device B 112(b), a root device 114, a device C 112(c), a device D 112(d), and a device E 112(e). Various other embodiments of electronic network 110 may contain a greater or lesser number of devices, which may be connected in numerous different configurations. Device A 112(a), device B 112(b), root device 114, device C 112(c), device D 112(d), and device E 112(e) may be implemented as any type of electronic device, including, but not limited to, personal computers, printers, digital video disc devices, television sets, audio systems, video cassette recorders, and set-top boxes for digital broadcasting.

The devices in electronic network 110 preferably communicate with one another using a bus. The bus includes cable 132(a), cable 132(b), cable 132(c), cable 132(d), and cable 132(e). Device B 112(b) is coupled to device A 112(a) with cable 132(a), and to root device 114 with cable 132(b). Root device 114 is coupled to device C 112(c) with cable 132(c) and to device D 112(d) with cable 132(d). Device D 112(d) is coupled to device E 112(e) with cable 132(e). In the FIG. 1 embodiment, cables 132(a) through 132(e) preferably implement the 1394-1995 IEEE Standard for a High Performance Serial Bus, which is hereby incorporated by reference. However, other network connectivity standards are within the scope of the present invention.

Each device in electronic network 110 may communicate with any other device in the network. For example, device E 112(e) may communicate with device B 112(b) by transmitting data via cable 132(e) to device D 112(d), which then transmits the data via cable 132(d) to root device 114. Root device 114 then transmits the data to device B 112(b) via cable 132(b). In the FIG. 1 embodiment, root device 114 provides a master clock signal to synchronize operations for all of the devices in network 110. In other embodiments of network 110, any one of the network devices may be designated as the root device, or cycle master.

Figure 2:
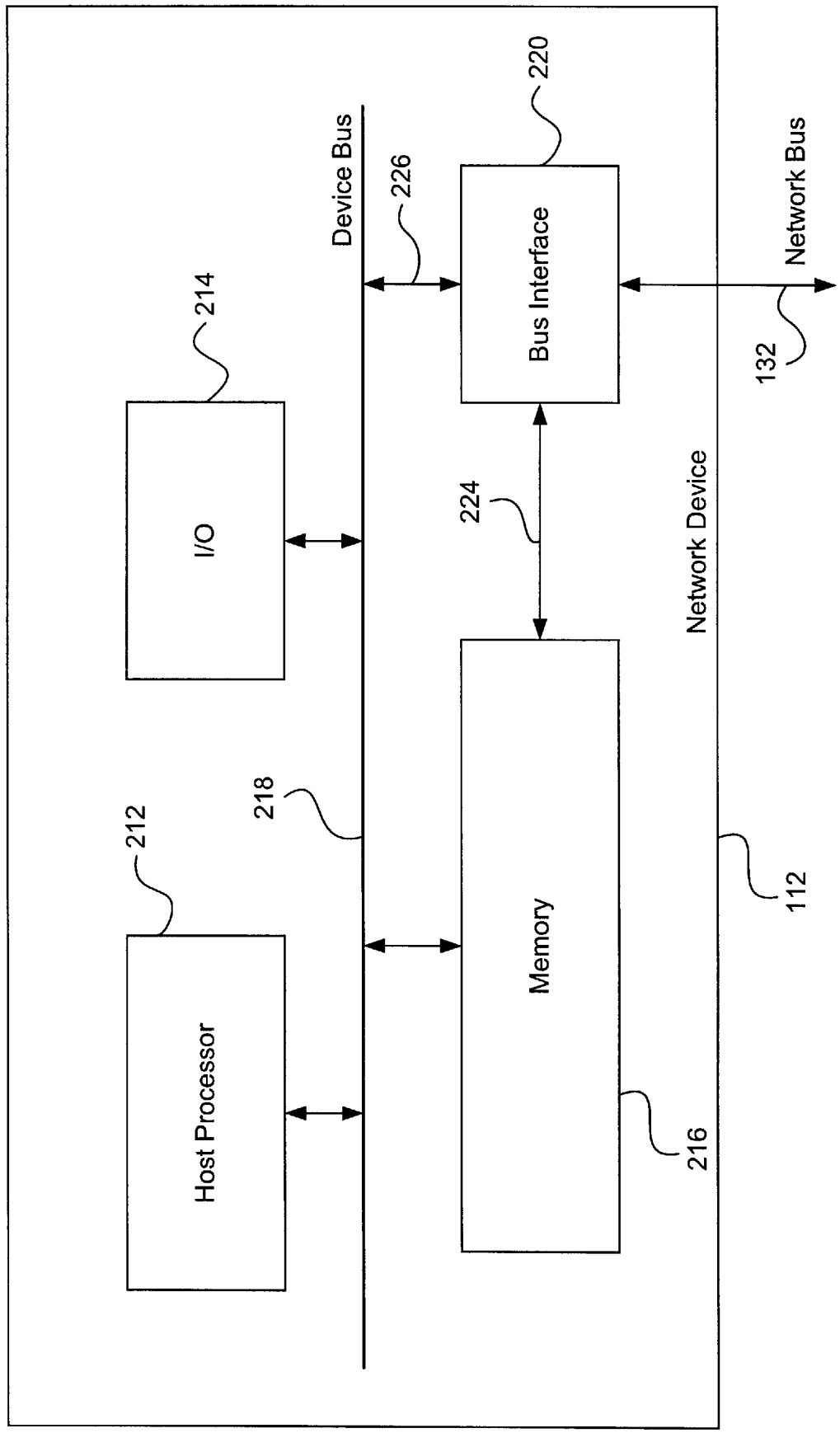
FIG. 2 is a block diagram for one embodiment of an exemplary network device from FIG. 1, according to the present invention.

Referring now to FIG. 2, a block diagram for one embodiment of an exemplary network device 112 in network 110 is shown, according to the present invention. Device 112 preferably includes, but is not limited to, a host processor 212, an input/output (I/O) interface 214, a memory 216, a device bus 218, and a bus interface 220. Host processor 212, I/O interface 214, memory 216 and bus interface 220 preferably communicate via device bus 218.

Host processor 212 may be implemented as any appropriate multipurpose microprocessor device. Memory 216 may be implemented as any combination of storage devices, including, but not limited to, read-only memory, random-access memory, and various types of non-volatile memory, such as floppy discs or hard discs. I/O interface 214 may provide an interface to a network other than network 110, for example the Internet. Bus interface 220 provides an interface between device 112 and network 110, and communicates with network 110 via cable 132. Bus interface 220 communicates with host processor 212, I/O device 214, and memory 216 via a path 226 and device bus 218. Bus interface 220 may also directly communicate with memory 216 via a path 224.

Figure 3:
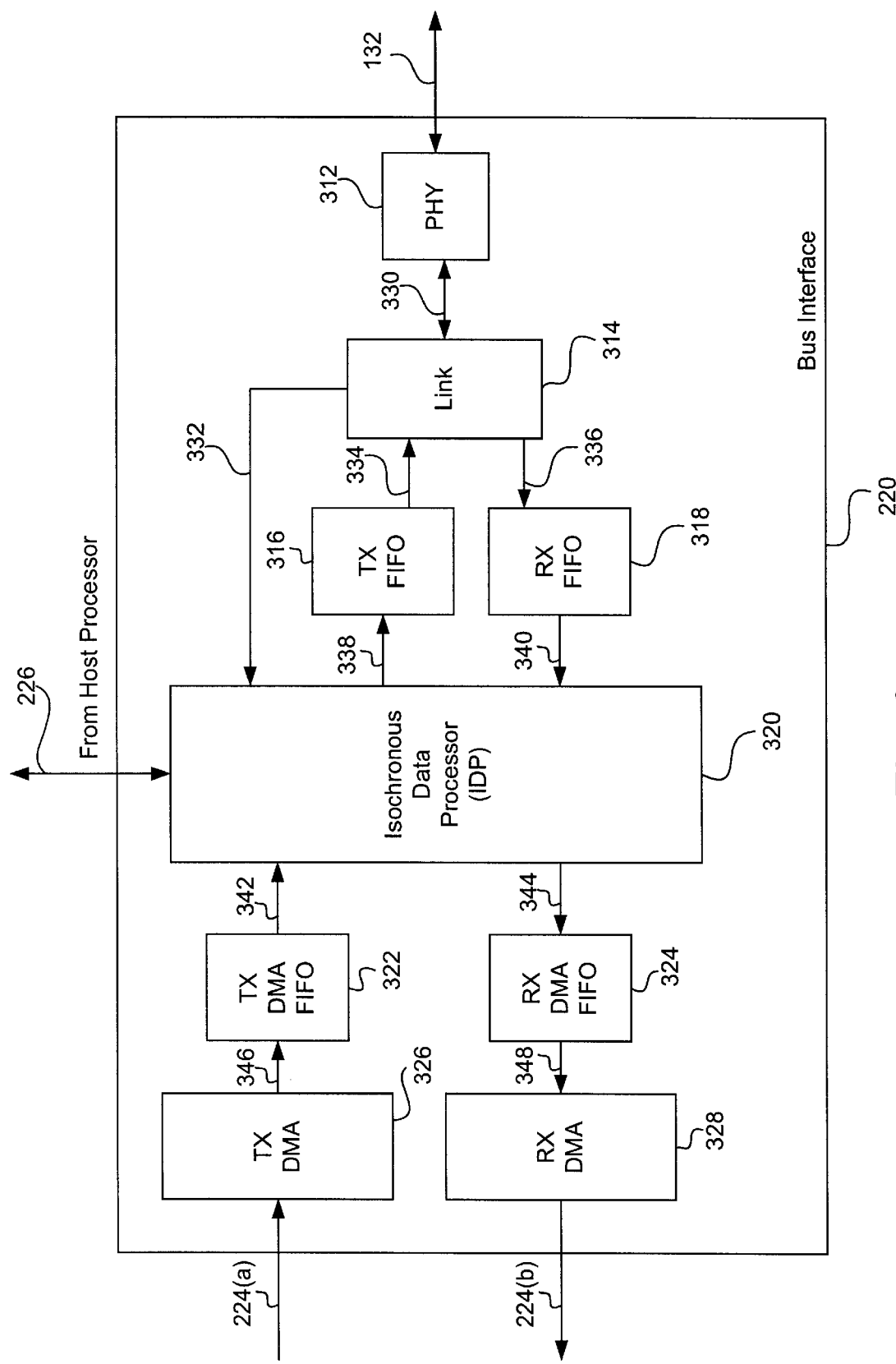
FIG. 3 is a block diagram for one embodiment of the bus interface of FIG. 2, according to the present invention.

Referring now to FIG. 3, a block diagram for one embodiment of the bus interface 220 of FIG. 2 is shown, according to the present invention. Bus interface 220 includes, but is not limited to, a physical layer (PHY) 312, a link layer (link) 314, a transmit first-in-first-out register (TX FIFO) 316, a receive first-in-first-out register (RX FIFO) 318, an isochronous data processor (IDP) 320, a transmit direct-memory-access FIFO (TX DMA FIFO) 322, a receive direct-memory-access FIFO (RX DMA FIFO) 324, a transmit direct-memory-access (TX DMA) 326, and a receive direct-memory-access (RX DMA) 328. Bus interface 220 typically also includes an asynchronous data processor (not shown) that manages traditional asynchronous data transfer operations.

Isochronous data transfers are typically used for time-sensitive applications. For example, video or audio data being transmitted across a network to a computer, television or other display device needs to arrive at the display device in an uninterrupted flow with appropriate timing. Isochronous data transfers allow data to be delivered as fast as it is displayed and allows synchronization of audio and video data. For example, an analog voice signal may be digitized at a rate of one byte every 125 microseconds. It is necessary to deliver this voice data at a rate of one byte every 125 microseconds for the display device to correctly reconstruct the analog voice signal.

In an IEEE 1394 serial bus network, each bus cycle is typically 125 microseconds and is determined by the cycle master. The cycle master generates a cycle start packet every 125 microseconds to synchronize the clocks of all devices on network 110. An isochronous data transfer is performed over a number of bus cycles, with an isochronous process associated with each bus cycle of the isochronous data transfer.

An isochronous process is guaranteed to have processor time and other system resources necessary for its execution during a particular bus cycle, so that isochronous processes have time to complete execution in each bus cycle. Any time in a bus cycle not used for isochronous processes is typically used for asynchronous processes, which execute independently of one another. The scheduling of isochronous processes is deterministic and has bounded latency. In other words, it is known when the isochronous processes will occur and each isochronous process will occur during a given amount of time.

In the FIG. 3 embodiment, when device 112 receives data on cable 132, then PHY 312 preferably transforms incoming bit stream data into bytes of data before passing the data to link 314 via path 330. Link 314 preferably decodes header information from incoming data packets and allocates the incoming data and the various pieces of header information to the appropriate destination. Header information indicates processing requirements of the corresponding data packets, and may typically include channel number, data type (for example, asynchronous or isochronous), and signal speed. Link 314 also preferably encodes header information for outgoing data packets in the format required by bus 132.

In network 110, each bus cycle preferably begins with a cycle start packet. The cycle start packet is generated by the cycle master and informs all of the devices on network 110 that data will be arriving on bus 132 from one or more of the devices. Link 314 allocates the cycle start packet to IDP 320 via path 332. Link 314 allocates other types of data received by device 112 to RX FIFO 318 via path 336. RX FIFO 318 preferably temporarily stores the received data before sending the data to IDP 320 via path 340. IDP 320 sends the received data to RX DMA FIFO 324 via path 344. The functionality of IDP 320 for received data is further discussed below in conjunction with FIG. 4. RX DMA FIFO 324 preferably temporarily stores the received data before sending the received data to RX DMA 328 via path 348. RX DMA 328 then preferably allocates the received data to memory 216 (FIG. 2) via path 224(b).

When device 112 transmits data on bus 132, TX DMA 326 preferably fetches the data from memory 216 via path 224(a) and sends the data to TX DMA FIFO 322 via path 346. TX DMA FIFO 322 preferably temporarily stores the data before sending the data to IDP 320 via path 342. The functionality of IDP 320 for transmitted data is further discussed below in conjunction with FIG. 4. IDP 320 then sends the data to TX FIFO 316 via path 338. TX FIFO 316 preferably temporarily stores the data before sending the data to link 314 via path 334. Link 314 next generates outgoing data packets with appropriate header information and sends the packets to PHY 312. PHY 312 then translates the bytes of the outgoing data packets into an outgoing bit stream for transmission over bus 132.

Figure 4:
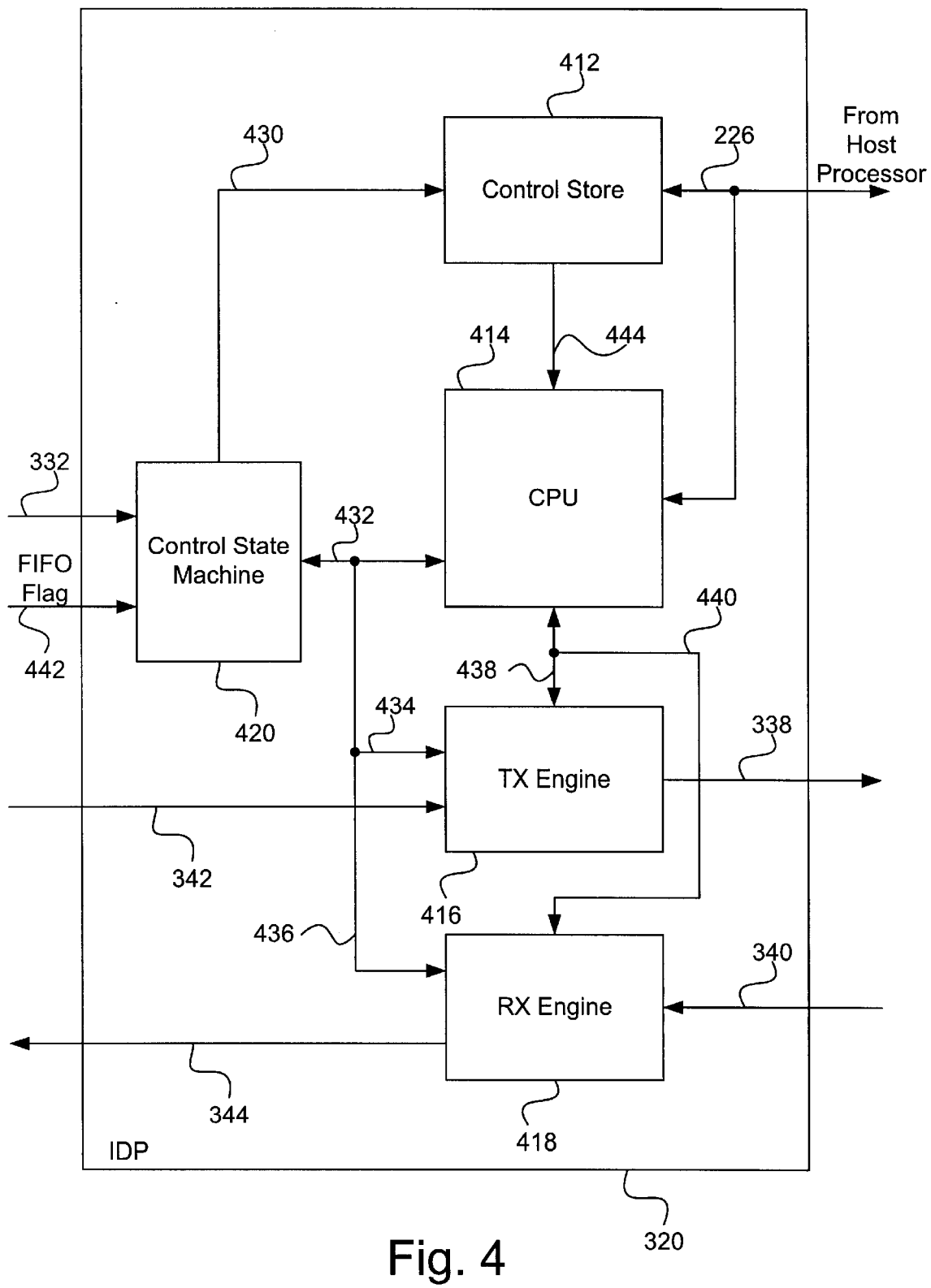
FIG. 4 is a block diagram for one embodiment of the isochronous data processor (IDP) of FIG. 3, according to the present invention.

Referring now to FIG. 4, a block diagram for one embodiment of the isochronous data processor (IDP) 320 of FIG. 3 is shown, according to the present invention. IDP 320 includes, but is not limited to, a control store 412, a central processing unit (CPU) 414, a transmit (TX) engine 416, a receive (RX) engine 418, and a control state machine 420.

In the FIG. 4 embodiment, control store 412 is a memory that preferably contains various instructions that are output via path 444 to CPU 414 for execution. The instructions are preferably loaded into control store 412 by host processor 212 (FIG. 2) via path 226. Host processor 212 also preferably loads information into a register file inside CPU 414 via path 226. Further, host processor 212 may also read back the contents of control store 412 and the register file inside CPU 414. The contents and functionality of control store 412 are further described below in conjunction with FIG. 5.

CPU 414 performs various operations on incoming and outgoing data according to the instructions from control store 412. CPU 414 operates on outgoing data in conjunction with TX engine 416, and operates on incoming data in conjunction with RX engine 418. CPU 414 also processes information in the cycle start packets provided by link 314.

Control state machine 420 receives various signals from link 314 (FIG. 3) via path 332. The signals from link 314 typically include the context of data packets on bus 132, signal speed, and a channel number for received data packets. Control state machine 420 also receives a FIFO flag 442 that indicates whether TX FIFO 316, RX FIFO 318, TX DMA FIFO 322 and RX DMA FIFO 324 are full or able to receive data. Control state machine 420 also receives control signals from CPU 414 via path 432. Control state machine 420 utilizes these various signals to responsively select appropriate instructions in control store 412 for execution by CPU 414.

When device 112 is required to switch contexts, control state machine 420 selects an appropriate instruction module in control store 412. For example, when device 112 is transmitting data over bus 132, control state machine 420 selects a transmit instruction module in control store 412 for execution by CPU 414. When device 112 is receiving data from bus 132, control state machine 420 selects a receive instruction module in control store 412 for execution by CPU 414. The functionality of control state machine 420 is further described below in conjunction with FIG. 5.

Figure 5:
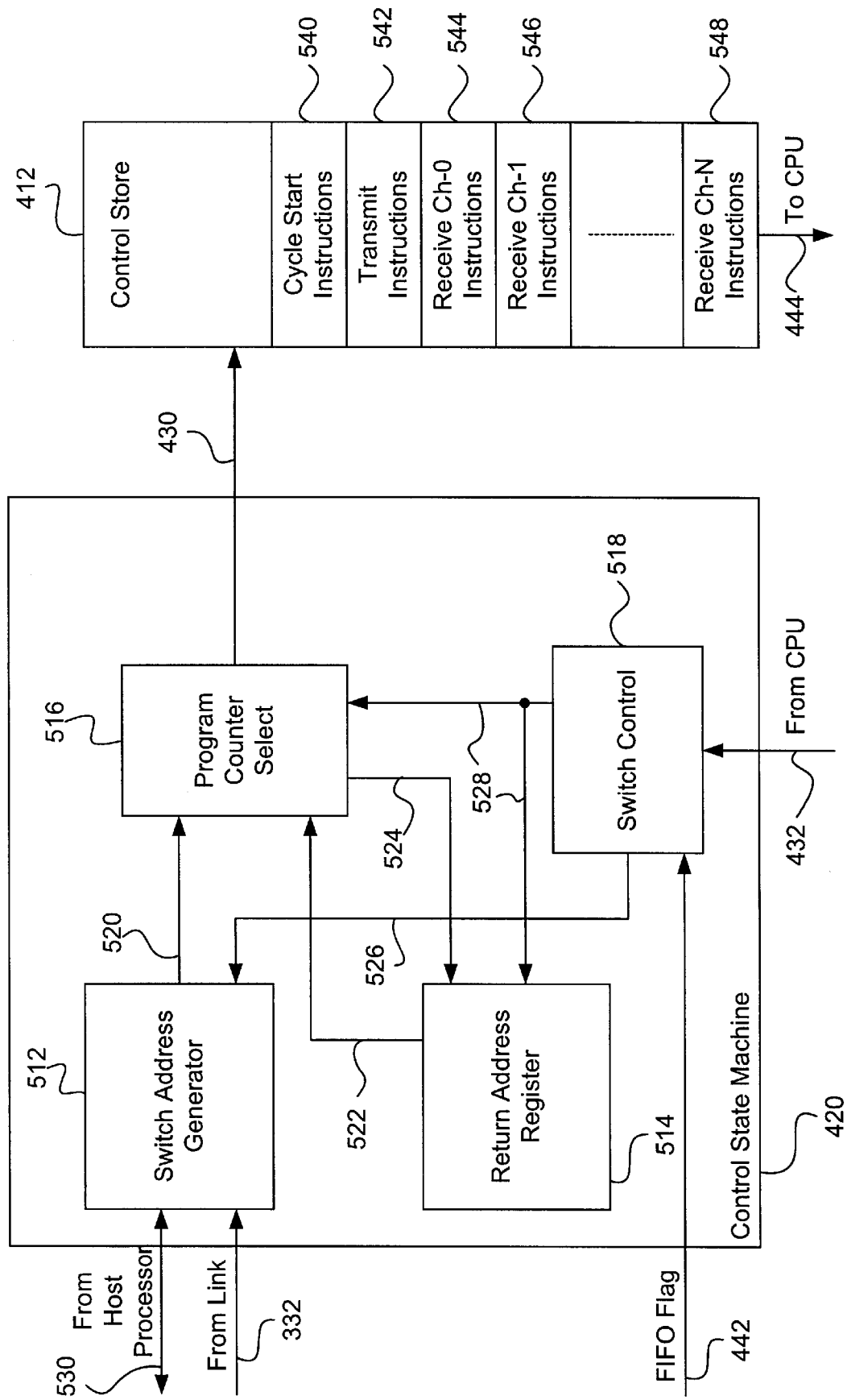
FIG. 5 is a block diagram for one embodiment of the control state machine and the control store of FIG. 4, according to the present invention.

Referring now to FIG. 5, a block diagram for one embodiment of the control state machine 420 and the control store 412 of FIG. 4 is shown, according to the present invention. Control state machine 420 includes, but is not limited to, a switch address generator 512, a return address register 514, a program counter select 516, and a switch control 518. Control store 412 stores instruction modules, including cycle start instructions 540, transmit instructions 542, and receive instructions including receive channel 0 (Ch-0) instructions 544 through receive channel N (Ch-N) instructions 548. An IEEE 1394 serial bus network may support up to sixty-four data channels; however, a network utilizing any number of channels is within the scope of the present invention. Control store 412 may also include other instructions for execution by CPU 414.

When device 112 receives a cycle start packet on bus 132, switch control 518 sends a control signal to switch address generator 512 via path 526. Switch address generator 512 responsively generates the appropriate address for the first instruction of cycle start instructions 540, which becomes the switch address. Switch address generator 512 outputs the switch address to program counter select 516 via path 520. Switch control 518 sends a control signal to program counter select 516 via path 528 to select the switch address, which is then output to control store 412 via path 430. Control store 412 responsively sends the first instruction of cycle start instructions 540 to CPU 414 via path 444. Switch control 518 then sends a control signal to program counter select 516 whereby program counter select 516 outputs consecutive addresses to control store 412 so that consecutive cycle start instructions 540 are output to CPU 414 for execution.

When device 112 transmits data to network 110 via bus 132, switch control 518 receives a start signal from CPU 414 via path 432. Switch control 518 then preferably checks FIFO flag 442 to ascertain whether TX DMA FIFO 322 (FIG. 3) is not empty. If TX DMA FIFO 322 is not empty, switch control 518 sends a control signal to switch address generator 512, which responsively generates the appropriate address for the first instruction of transmit instructions 542, which becomes the switch address. Switch control 518 then sends a control signal to program counter select 516 to select the switch address. Control store 412 then sends the first instruction of transmit instructions 542 to CPU 414, which begins transmitting the data in TX DMA FIFO 322 in conjunction with TX engine 416. Switch control 518 next sends a control signal to program counter select 516 so that program counter select 516 outputs consecutive addresses for transmit instructions 542.

While device 112 is transmitting data, another device in network 110 may begin sending data to device 112. If device 112 does not switch contexts to a receive context and begin receiving data, then the data may be lost. Thus device 112 will preferably interrupt the transmission process and begin receiving data. After receiving the incoming data, device 112 will preferably resume transmission where the foregoing transmission process was interrupted.

To allow device 112 to resume transmission of data, return address register 514 preferably stores the address of the next consecutive transmit instruction 542. Program counter select 516 outputs the address for the next consecutive transmit instruction 542 on path 524. Switch control 518 sends a control signal to return address register 514, whereby return address register 514 stores the address for the next transmit instruction 542. The address of the next consecutive transmit instruction 542 thus becomes the return address.

In response to information from link 314 via path 332 and a control signal from switch control 518 via path 526, switch address generator 512 outputs the address for the first instruction of the appropriate receive instruction module, for example receive Ch-1 instructions 546. Switch control 518 sends a control signal to program counter select 516 to select the switch address as the output to control store 412. Control store 412 responsively sends the first instruction of receive Ch-1 instructions 546 to CPU 414 for execution. Switch control 518 then sends a control signal to program counter select 516 whereby consecutive addresses of receive Ch-1 instructions 546 are output to control store 412.

When CPU 414 has completed the execution of receive Ch-1 instructions 546, device 112 preferably resumes transmission of data where the transmission operation was interrupted. Switch control 518 sends a control signal to program counter select 516 to select the return address on path 522 as the output to control store 412. Program counter select 516 outputs the return address to control store 412, which sends the appropriate transmit instruction 542 to CPU 414 to resume transmission of data. Switch control 518 next sends a control signal to program counter select 516 so that program counter select 516 outputs consecutive addresses for the remaining transmit instructions 542.

Switch control 518 is preferably a state machine that, after receiving a start signal from CPU 414, remains in a transmit mode until a context switch is required, even if data is not currently being transmitted by device 112. When a context switch is required, switch control 518 changes to a receive mode or a cycle start mode and sends the appropriate control signals to switch address generator 512, return address register 514, and program counter select 516 as described above. When the receive operation or the cycle start operation is complete, switch control 518 then returns to the transmit mode.

Figure 6:
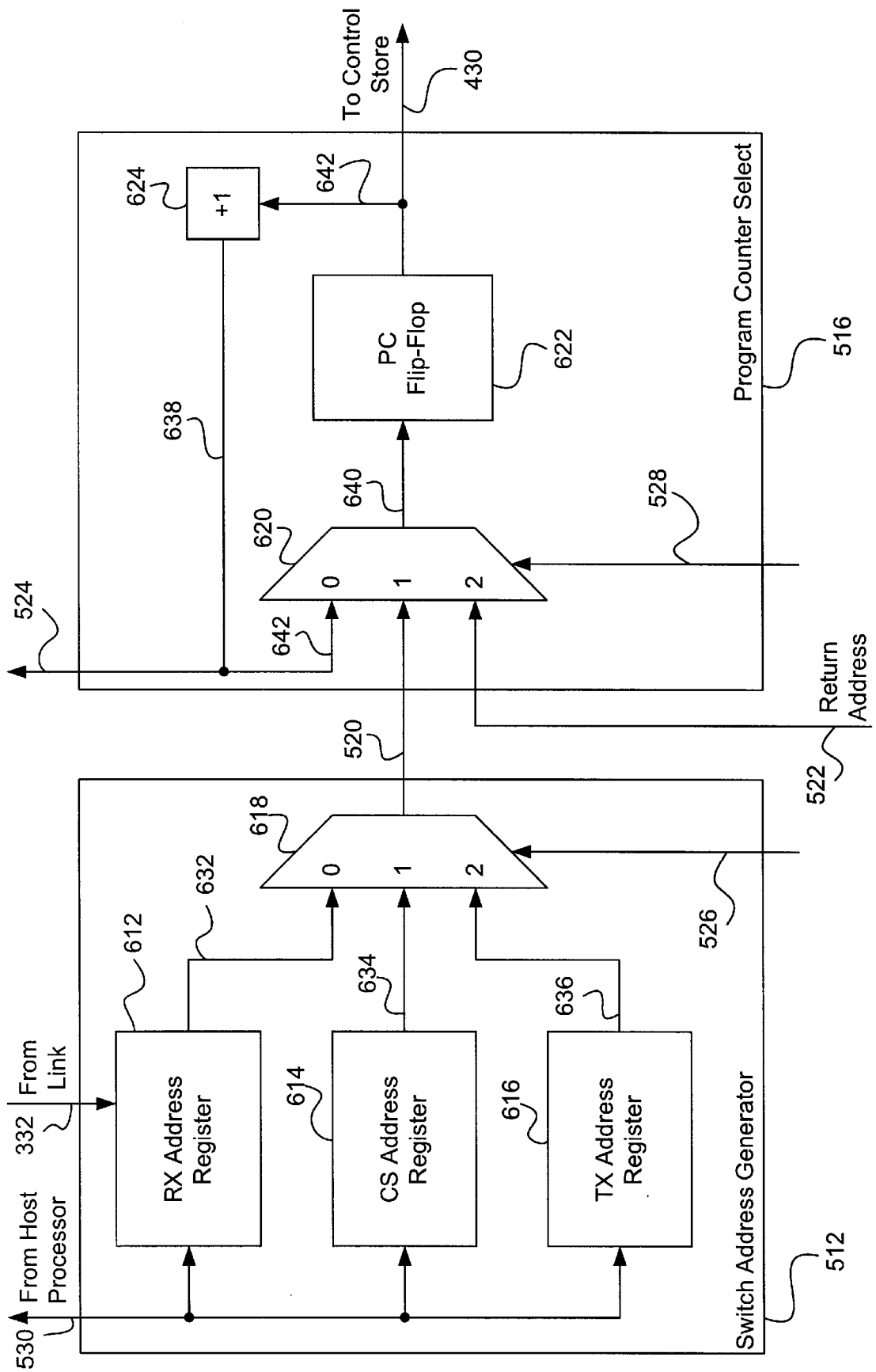
FIG. 6 is a block diagram for one embodiment of the switch address generator and the program counter select of FIG. 5, according to the present invention.

Referring now to FIG. 6, a block diagram for one embodiment of the switch address generator 512 and the program counter select 516 of FIG. 5 is shown, according to the present invention. Switch address generator 512 includes, but is not limited to, a receive (RX) address register 612, a cycle start (CS) address register 614, a transmit (TX) address register 616, and a multiplexer 618.

When host processor 212 (FIG. 2) writes instructions to control store 412, then host processor 212 also writes the address of the first instruction of each instruction module to switch address generator 512 via path 530. The address of the first cycle start instruction 540 is stored in CS address register 614, and the address of the first transmit instruction 542 is stored in TX address register 616. The addresses of the first instruction of each receive instruction module 544 through 548 are stored in RX address register 612. A signal from link 314 to RX address register 612 determines which of the receive instruction addresses is output to multiplexer 618 via path 632. The receive instruction address output to multiplexer 618 preferably corresponds to the channel of the data being received by device 112.

One of the addresses stored in switch address generator 512 is output to program counter select 516 in response to a control signal from switch control 518 via path 526. When input 0 of multiplexer 618 is selected, the first address of the appropriate receive instruction module becomes the switch address and is output to program counter select 516. When input 1 of multiplexer 618 is selected, the address of the first cycle start instruction becomes the switch address and is output to program counter select 516. When input 2 of multiplexer 618 is selected, the address of the first transmit instruction becomes the switch address and is output to program counter select 516.

Program counter select 516 includes, but is not limited to, a multiplexer 620, a program counter (PC) flip-flop 622, and an incrementer 624. Program counter select 516 outputs either the switch address, the return address, or the next consecutive address in response to a control signal from switch control 518 via path 528. When input 1 of multiplexer 620 is selected, the switch address is output to control store 412. When input 2 of multiplexer 620 is selected, the return address is output to control store 412.

When input 0 of multiplexer 620 is selected, a next consecutive address is output to control store 412. The next consecutive address is generated by incrementer 624, which receives the current output of program counter select 516 and increments the current output by 1. The next consecutive address is input to multiplexer 620 via path 642 and to return address register 514 via path 524. Return address register 514 stores the next consecutive address in response to a control signal from switch control 518 when a transmission is interrupted, as described above in conjunction with FIG. 5. PC flip-flop 622 latches the currently selected address to control store 412.

Figure 7:
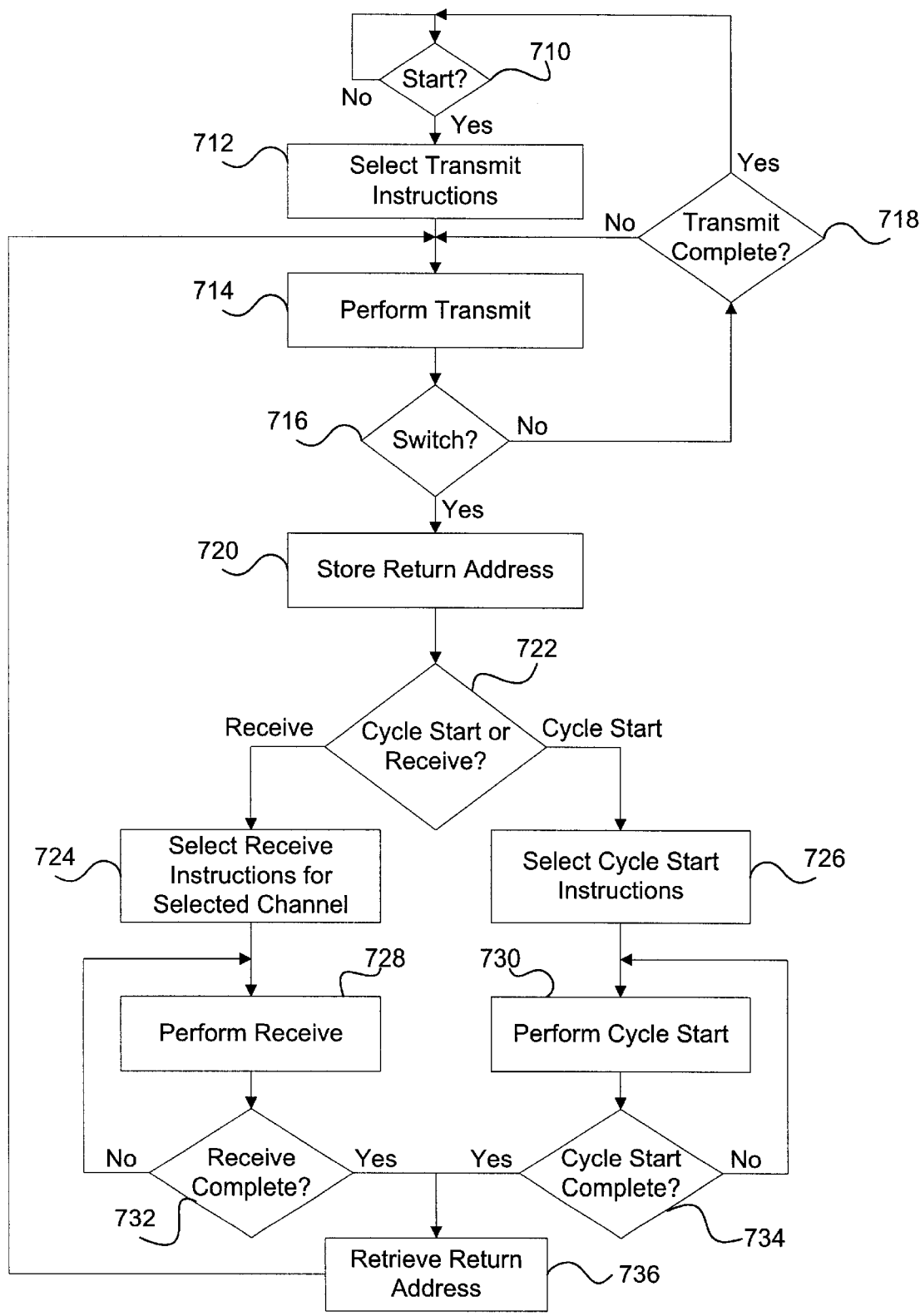
FIG. 7 is a flowchart of method steps for context switching in an electronic network, according to one embodiment of the present invention.

Referring now to FIG. 7, a flowchart of method steps for context switching in an electronic network is shown, according to one embodiment of the present invention. Initially, in step 710, control state machine 420 waits for a start signal from CPU 414. If control state machine 420 receives a start signal, then, in step 712, control state machine 420 selects the address of the first instruction of transmit instructions 542 in control store 412. Then, in step 714, control store 412 sends the instruction to CPU 414, which performs the selected transmit instruction. After each transmit instruction is performed, control state machine 420 determines, in step 716, whether a context switch should take place as detected by link 314. If a context switch should not take place, then, in step 718, control state machine 420 determines whether the transmit operation is complete. If the transmit operation is complete, then the FIG. 7 method returns to step 710. If the transmit operation is not complete, then the FIG. 7 method returns to step 714, where CPU 414 continues to perform the transmit operation.

If, in step 716, control state machine 420 determines that a context switch should take place, then, in step 720, control state machine 420 stores the address of the next consecutive transmit instruction, which becomes the return address, in return address register 514. In step 722, control state machine 420 determines whether the required context is a cycle start context or a receive context according to information from link 314. If the required context is the cycle start context, then the method continues with step 726. If the required context is the receive context, then the method continues with step 724.

During the cycle start context, in step 726, control state machine 420 selects the address of the first instruction of cycle start instructions 540 in control store 412. Then, in step 730, CPU 414 executes cycle start instructions 540 in sequence to perform a cycle start operation. In step 734, control state machine 420 determines after execution of each instruction whether the cycle start operation is complete. If the cycle start operation is not complete, the FIG. 7 method returns to step 730 to continue the cycle start operation. However, if the cycle start operation is complete, the FIG. 7 method continues with step 736.

During the receive context, in step 724, control state machine 420 selects the address of the first instruction of the appropriate receive instruction module in control store 412 (for example, receive Ch-0 instructions 544). Then, in step 728, CPU 414 executes the receive instructions in sequence to perform a receive operation. In step 732, control state machine 420 determines after execution of each instruction whether the receive operation is complete. If the receive operation is not complete, then the FIG. 7 method returns to step 728 to continue the receive operation.

However, if the receive operation is complete, then, in step 736, control state machine 420 retrieves the return address from return address register 514, and sends the return address to control store 412. The FIG. 7 method then returns to step 714, where CPU 414 recommences the interrupted transmit operation, beginning with the transmit instruction that corresponds to the return address. The FIG. 7 method steps discussed above describe a transmit operation being interrupted by a cycle start operation or a receive operation; however, other context switching scenarios are equally within the scope of the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for context switching in an electronic network, comprising:
   a memory configured to store instruction modules, each of said instruction modules corresponding to a context;
   a control state machine coupled to said memory and configured to select one of said instruction modules in response to context information from said electronic network, said control state machine interrupting an execution of a first-context instruction module, selecting a second-context instruction module for execution, and returning to said first-context instruction module upon completion of said second-context instruction module; and
   a processor coupled to said memory and configured to execute said instruction modules.

2. The system of claim 1, wherein said system is implemented in an interface between a host device and said electronic network.

3. The system of claim 2, wherein said system is implemented in an isochronous data processor in said interface.

4. The system of claim 2, wherein said control state machine returns to said first-context instruction module at a next consecutive instruction after a last executed instruction of said first-context instruction module.

5. The system of claim 1, wherein said electronic network is a serial bus network implementing an IEEE 1394 serial bus interconnectivity standard.

6. The system of claim 2, wherein said control state machine remains in a transmit mode when said host device transmits data and when said host device does not transmit data unless said control state machine changes to a second-context mode to perform a second-context operation, and wherein said control state machine returns to said transmit mode upon completion of said second-context operation.

7. The system of claim 2, wherein said host device is a consumer electronic device.

8. The system of claim 7, wherein said consumer electronic device is a digital video recording and playback device.

9. The system of claim 1, wherein said control state machine interrupts execution of a transmit instruction module, selects a receive instruction module for execution, and returns to said transmit instruction module upon completion of said receive instruction module.

10. The system of claim 1, wherein said control state machine interrupts execution of a transmit instruction module, selects a cycle start instruction module for execution, and returns to said transmit instruction module upon completion of said cycle start instruction module.

11. The system of claim 1, wherein said control state machine includes a switch address generator that generates a switch address corresponding to a first instruction of one of said instruction modules in response to said context information.

12. The system of claim 11, wherein said control state machine further includes a return address register that stores a return address corresponding to a return instruction for an interrupted instruction module.

13. The system of claim 12, wherein said control state machine further includes a program counter select which selects one of a group consisting of said switch address, said return address, and a next consecutive address.

14. The system of claim 11, wherein said switch address generator includes a transmit address register, a receive address register, and a cycle start address register.

15. The system of claim 14, wherein said transmit address register stores a transmit address for a first transmit instruction stored in said memory.

16. The system of claim 14, wherein said receive address register stores a receive address for a first receive instruction stored in said memory.

17. The system of claim 14, wherein said receive address register stores receive addresses for first receive instructions, each of said first receive instructions corresponding to a unique data channel.

18. The system of claim 14, wherein said receive address register stores eight receive addresses for eight first receive instructions, each of said eight first receive instructions corresponding a unique data channel.

19. The system of claim 14, wherein said cycle start address register stores a cycle start address for a first cycle start instruction stored in said memory.

20. A method for context switching in an electronic network, comprising the steps of:
storing instruction modules memory, each of said instruction modules corresponding to a context;
selecting one of said instruction modules in response to context information from said electronic network using a control state machine, said control state machine interrupting an execution of a first-context instruction module, selecting a second-context instruction module for execution, and returning to said first-context instruction module upon completion of said second-context instruction module; and
executing said instruction modules using a processor coupled to said memory.

21. The method of claim 20, wherein said memory, said control state machine, and said processor are implemented in an interface between a host device and said electronic network.

22. The method of claim 21, wherein said memory, said control state machine, and said processor are implemented in an isochronous data processor in said interface.

23. The method of claim 21, wherein said control state machine returns to said first-context instruction module at a next consecutive instruction after a last executed instruction of said first-context instruction module.

24. The method of claim 20, wherein said electronic network is a serial bus network implementing an IEEE 1394 serial bus interconnectivity standard.

25. The method of claim 21, wherein said control state machine remains in a transmit mode when said host device transmits data and when said host device does not transmit data unless said control state machine changes to a second-context mode to perform a second-context operation, and wherein said control state machine returns to said transmit mode upon completion of said second-context operation.

26. The method of claim 21, wherein said host device is a consumer electronic device.

27. The method of claim 26, wherein said consumer electronic device is a digital video recording and playback device.

28. The method of claim 20, wherein said control state machine interrupts execution of a transmit instruction module, selects a receive instruction module for execution, and returns to said transmit instruction module upon completion of said receive instruction module.

29. The method of claim 20, wherein said control state machine interrupts execution of a transmit instruction module, selects a cycle start instruction module for execution, and returns to said transmit instruction module upon completion of said cycle start instruction module.

30. The method of claim 20, wherein said control state machine includes a switch address generator that generates a switch address corresponding to a first instruction of one of said instruction modules in response to said context information.

31. The method of claim 30, wherein said control state machine further includes a return address register that stores a return address corresponding to a return instruction for an interrupted instruction module.

32. The method of claim 31, wherein said control state machine further includes a program counter select which selects one of a group consisting of said switch address, said return address, and a next consecutive address.

33. The method of claim 32, wherein said switch address generator outputs a transmit address for a first transmit instruction to said program counter select and said program counter select outputs said transmit address to said memory to select said first transmit instruction.

34. The method of claim 33, wherein said program counter select outputs next consecutive transmit addresses to said memory to select next consecutive transmit instructions.

35. The method of claim 30, wherein said switch address generator includes a transmit address register, a receive address register, and a cycle start address register.

36. The method of claim 35, wherein said transmit address register stores a transmit address for a first transmit instruction stored in said memory.

37. The method of claim 35, wherein said receive address register stores a receive address for a first receive instruction stored in said memory.

38. The method of claim 35, wherein said receive address register stores receive addresses for first receive instructions stored in said memory, each of said first receive instructions corresponding to a unique data channel.

39. The method of claim 35, wherein said receive address register stores eight receive addresses for eight first receive instructions stored in said memory, each of said eight first receive instructions corresponding to a unique data channel.

40. The method of claim 35, wherein said cycle start address register stores a cycle start address for a first cycle start instruction stored in said memory.

41. The method of claim 20, wherein said context information from said electronic network is contained in header information of corresponding data packets and indicates processing requirements of said corresponding data packets.

42. A method for context switching in an electronic network, comprising the steps of:
storing instruction modules in a memory, each of said instruction modules corresponding to a context;
selecting one of said instruction modules in response to context information from said electronic network using a control state machine, said control state machine including a switch address generator that generates a switch address corresponding to a first instruction of one of said instruction modules in response to said context information, said control state machine further including a return address register that stores a return address corresponding to a return instruction for an interrupted instruction module, said control state machine also including a program counter select which selects one of a group consisting of said switch address, said return address, and a next consecutive address, said switch address generator outputting a transmit address for a first transmit instruction to said program counter select, said program counter select outputting said transmit address to said memory to select said first transmit instruction, said program counter select outputting next consecutive transmit addresses to said memory to select next consecutive transmit instructions, said program counter select outputting a next consecutive transmit address to said return address register in response to said context information from said electronic network, said return address register storing said next consecutive transmit address as said return address; and executing said instruction modules using a processor coupled to said memory.

43. The method of claim 42, wherein said switch address generator outputs a receive address for a first receive instruction of a receive instruction module to said program counter select in response to header information from said electronic network and said program counter select outputs said receive address to said memory to select said first receive instruction.

44. The method of claim 43, wherein said program counter select outputs text consecutive receive addresses to said memory to select next consecutive receive instructions.

45. The method of claim 44, wherein said return address register outputs aid return address to said program counter select and said program counter elect outputs said return address to said memory to select a return transmit instruction upon completion of said receive instruction module.

* * * * *